(12) United States Patent
Bilodeau et al.

(10) Patent No.: US 8,383,247 B2
(45) Date of Patent: Feb. 26, 2013

(54) LIGHTWEIGHT COMPOSITE ARTICLE WITH CONTROLLED BIODEGRADATION

(75) Inventors: Michael A. Bilodeau, Brewer, ME (US); Anthony Jabar, Jr., Waterville, ME (US); Jonathan M. Spender, Enfield, ME (US)

(73) Assignees: Cerealus Holdings, LLC, Waterville, ME (US); University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 12/741,926

(22) PCT Filed: Nov. 10, 2008

(86) PCT No.: PCT/US2008/082962
§ 371 (c)(1),
(2), (4) Date: Dec. 28, 2010

(87) PCT Pub. No.: WO2009/062141
PCT Pub. Date: May 14, 2009

(65) Prior Publication Data
US 2011/0104465 A1 May 5, 2011

Related U.S. Application Data

(60) Provisional application No. 61/002,416, filed on Nov. 8, 2007.

(51) Int. Cl.
*B32B 23/04* (2006.01)
(52) U.S. Cl. ...... 428/532; 428/534; 428/536; 405/129.9
(58) Field of Classification Search .................. 428/532, 428/534, 536; 405/129.9
See application file for complete search history.

(56) References Cited

U.S. PATENT DOCUMENTS

| | | | |
|---|---|---|---|
| 3,274,731 | A | 9/1966 | Vigneault et al. |
| 3,384,993 | A | 5/1968 | Kane |
| 3,387,405 | A | 6/1968 | Iwasyk et al. |
| 3,454,510 | A | 7/1969 | Newland et al. |
| 3,623,266 | A | 11/1971 | Nakayama |
| 3,929,937 | A | 12/1975 | Clendinning et al. |
| 3,949,145 | A | 4/1976 | Otey et al. |
| 5,163,247 | A | 11/1992 | Weber et al. |
| 5,464,878 | A | 11/1995 | Nemphos et al. |
| 5,532,298 | A | 7/1996 | Monroe et al. |
| 5,763,518 | A | 6/1998 | Gnatowski et al. |
| 5,866,269 | A | 2/1999 | Dalabroux et al. |
| 5,937,573 | A | 8/1999 | Mizuguchi et al. |
| 6,312,826 | B1 | 11/2001 | Shogren |
| 6,399,185 | B1 | 6/2002 | Cathey |
| 6,401,390 | B1 | 6/2002 | Labbe et al. |
| 6,625,923 | B2 | 9/2003 | Lee et al. |
| 7,737,200 | B2 * | 6/2010 | Jabar, Jr. et al. ............. 524/18 |
| 8,100,605 | B2 * | 1/2012 | Bishop et al. .............. 405/129.9 |

FOREIGN PATENT DOCUMENTS

| | | |
|---|---|---|
| GB | 1434042 | 4/1976 |
| JP | 59169992 | 9/1984 |
| JP | 60025902 | 2/1985 |
| JP | 09275820 | 10/1996 |
| SU | 1209059 A | 9/1984 |

* cited by examiner

*Primary Examiner* — Leszek Kiliman
(74) *Attorney, Agent, or Firm* — MacMillan, Sobanski & Todd, LLC

(57) ABSTRACT

A lightweight composite article with controlled biodegradation includes a fibrous substrate and one or more additives applied to the fibrous substrate to control the rate of biodegradation of the composite article. The composite article has a weight of less than about 57 grams per square meter, and a biodegradation within a range of from about 30 days to about 150 days. In some embodiments, the additives include one or more of water repellent, antimicrobial agent and biodegradable binder.

16 Claims, 1 Drawing Sheet

US 8,383,247 B2

LIGHTWEIGHT COMPOSITE ARTICLE WITH CONTROLLED BIODEGRADATION

CROSS-REFERENCE TO RELATED APPLICATIONS

This application is the National Phase of International Application PCT/US2008/082962 filed Nov. 10, 2008 which designated the U.S. and that International Application was published in English under PCT Article 21(2) on May 14, 2009 as International Publication Number WO 2009/062141 A2. PCT/US2008/082962 claims priority to U.S. Provisional Application No. 61/002,416, filed Nov. 8, 2007. Thus, the subject nonprovisional application claims priority to U.S. Provisional Application No. 61/002,416, filed Nov. 8, 2007. The disclosures of both applications are incorporated herein by reference.

BACKGROUND OF THE INVENTION

This invention relates in general to composite articles and in particular to a lightweight composite article with controlled biodegradation that may be used, for example, as a mulch in the agriculture, horticulture and/or forestry industries.

Plastic mulches are widely used in numerous agricultural applications to control weeds, retain moisture in the soil and increase soil temperature to facilitate plant growth and to increase crop quality and yield.

Some characteristics of a mulch may include having sufficient mechanical strength so that they may be used in commercial farming operations with heavy duty equipment, resistance to stresses caused by weather (rain, sun, wind, etc.), puncture resistance to growing weeds, sufficient wet strength, moisture retention and/or ultraviolet light absorption. Another characteristic is the ability of the mulch to be tilled into the soil by agricultural equipment at the end of the growing season.

A wide variety of mulch products have been developed. Traditionally, agricultural mulch films have been predominantly comprised of either low or high density polyethylene because they are relatively inexpensive and more resistant to severe weather conditions than other materials. However, these materials are not considered biodegradable so they are removed and land filled at the end of the growing season.

To address the biodegradability problem some mulches are made from paper. However, paper alone generally degrades too quickly, does not retain sufficient ground moisture or lacks sufficient strength to be used in commercial agricultural operations. Mulches have also been produced from paper coated with various polymer materials to increase their strength and slow their degradation rate, but the coated paper mulches have not been totally successful.

SUMMARY OF THE INVENTION

This invention relates to a lightweight composite article with controlled biodegradation. The composite article comprises a fibrous substrate and one or more additives applied to the fibrous substrate to control the rate of biodegradation of the composite article. The composite article has a weight of less than about 57 grams per square meter, and a biodegradation rate within a range of from about 30 days to about 150 days. In some embodiments, the additives include one or more of water repellent, antimicrobial agent and biodegradable binder.

Various aspects of the composite article will become apparent to those skilled in the art from the following detailed description of the preferred embodiment, when read in light of the accompanying drawings.

DETAILED DESCRIPTION OF THE PREFERRED EMBODIMENT

Figure 1:
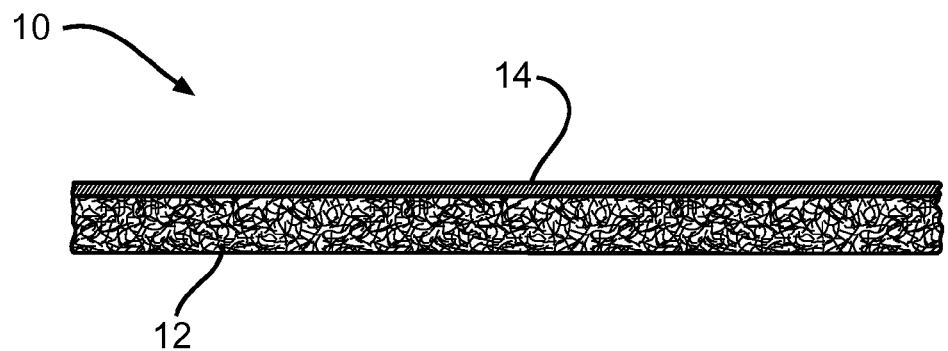
FIG. 1 is an enlarged cross-sectional view of a composite article including a paper sheet coated with a layer of additives that control the rate of biodegradation of the article.

Referring now to the drawings, there is illustrated in FIG. 1 a first embodiment of a composite article 10. The composite article includes a fibrous substrate 12 that functions as the base material of the article. Any suitable type of substrate can be used in the composite article. In one embodiment, the substrate is in the form of a continuous fibrous sheet or web, which is any type of broad, relatively thin structure made from fibers, for example a fibrous film. The fibers can be held together in any suitable manner. In a particular embodiment, the substrate is a paper sheet. The paper can be produced in any suitable manner, for example on a paper machine such as a Foudrinier paper machine. In one embodiment, the paper sheet is extensible.

The fibrous substrate can be produced from any suitable type of fibers or a combination of different fiber types. In one embodiment, the fibrous substrate comprises one or more types of natural fibers. Any suitable natural fibers can be used in the fibrous substrate. For instance, the natural fibers can be any suitable type of carbohydrate fibers, some nonlimiting examples of which include fibers of cellulose, microcellulose, nanocellulose, hemicellulose, derivatives thereof, or a combination thereof. Paper is an amalgamation of cellulose fibers derived from wood pulp.

Alternatively, the natural fibers can be any suitable type of proteinaceous fibers, some nonlimiting examples of which include fibers derived from corn, silk, kenaf, wheat, sorghum, flax, hemp, bagasse, switchgrass, or a combination thereof.

Referring again to FIG. 1, the composite article 10 also includes one or more additives 14 applied to the fibrous substrate 12 to control the rate of biodegradation of the composite article. The additives can be applied to the fibrous substrate in any suitable manner. In some embodiments, the additive(s) are applied to the fibrous substrate by saturating the fibrous substrate, coating the fibrous substrate, or a combination thereof.

In the embodiment shown in FIG. 1, a mixture of additives 14 is applied as a coating layer on one side of the fibrous substrate 12. Alternatively, the additives could be applied to coat both sides of the fibrous substrate (not shown). Any suitable coating method can be used for applying the additives as a coating on the fibrous substrate. For example, the coating can be applied by extrusion, spraying, rolling, spreading, brushing, pouring, curtain coating, or dipping. A doctor blade, knife blade or similar device can be used to smooth the applied coating. After application the coating is then dried.

Figure 2:
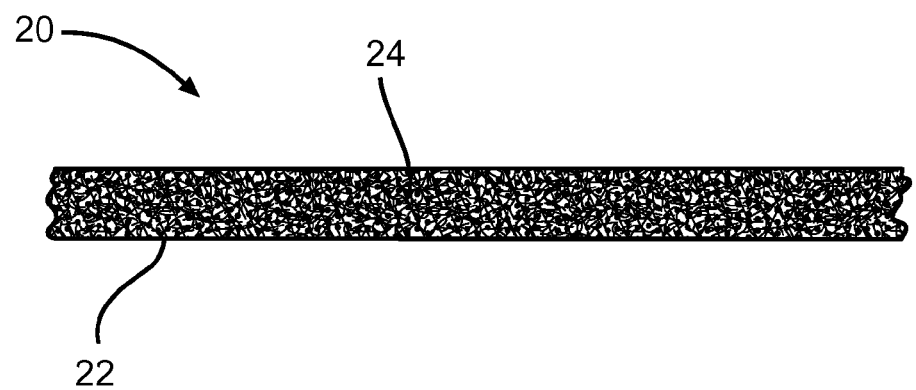
FIG. 2 is an enlarged cross-sectional view of a composite article including a paper sheet saturated but not coated with the additives.

FIG. 2 shows an embodiment of a composite article 20 including a fibrous substrate 22 and a mixture of additives 24 saturating the substrate. The additives can be applied to saturate the fibrous substrate in any suitable manner. For example, many of the above-mentioned coating methods will result in the additives saturating the fibrous substrate if the fibrous substrate is sufficiently porous and/or the mixture of additives is sufficiently fluid. The embodiment shown in FIG. 2 does not include a coating of the additives on the substrate, but a coating of the additives could also be applied along with the additives saturating the substrate.

The one or more additives applied to the fibrous substrate can be any type of additive(s), or a combination of different additives, that are suitable to control the rate of biodegradation of the composite article. The additives can either speed up or slow down the rate of biodegradation depending on a particular application. The additives may also provide the composite article with other desired properties.

In some embodiments, the additives include one or more of antimicrobial agent, water repellent and biodegradable binder. Any suitable antimicrobial agent or a mixture of different antimicrobial agents can be used. The antimicrobial agents include both fungicidal and antibacterial agents. Some nonlimiting examples include quaternary ammonium compounds, copper naphthenate, nitrophenylacetate, phenylhydrazine, polybrominated salicylanilides, chlorhexidine, domiphen bromide, cetylpyridinium chloride, benzethonium chloride, 2,2'-thiobis thiobis(4,6-dichloro)phenol, 2,2'-methylenebis-(3,4,6'-trichloro)phenol and 2,4,4'-trichloro-2'-hydroxydiphenyl ether.

In a particular embodiment the antimicrobial agent comprises zeolite. Any suitable zeolite or a mixture of different zeolites can be used. Some nonlimiting examples of zeolites that may be used include clinoptilolite, mordenite, aluminite, sodalite-group alminosilicates, erionite, chabasite, zeolite A, zeolite X, zeolite Y, and zeolite P.

Any suitable water repellent or a combination of different water repellents can be used. For example, the water repellent can be paraffin wax, other petroleum based water repellent materials, sizing agents (such as rosin size or synthetic reactive size), or any other suitable hydrophobic material.

In a particular embodiment, the water repellent is a drying oil. Any suitable drying oil or a mixture of different drying oils can be used. In some embodiments the drying oil is a vegetable oil, for example sunflower oil, linseed oil, dehydrated castor oil, coconut oil or dehydrated coconut oil. Other types of drying oils are fish oils, for example tuna fish oil.

Any suitable biodegradable binder or a combination of different binders can be used. For example, the binder can be a biopolymer such as polylactic acid, polyhydroxyalkinate, polyhydroxybutyrate, carboxylated methylcellulose, or any other suitable biopolymer.

In a particular embodiment the biodegradable binder comprises prolamine. Any suitable prolamine or a mixture of different prolamines can be used. Prolamines are proteinaceous compounds present as the storage proteins of cereal grains, such as corn, wheat, barley, rice and sorghum. Representative prolamines include, for example, zein, hordein, gliadin and kafirin. In a particular embodiment the prolamine used in the barrier composition is zein.

In one embodiment, the prolamine is mixed with one or more of the following materials to produce a barrier composition: (a) cold water insoluble polymer, (b) water, (c) water soluble co-solvent, and (d) stabilizer.

Any suitable cold water insoluble polymer or a mixture of different polymers can be used in the barrier composition. By "cold water insoluble" is meant that the polymer is insoluble in water at temperatures of 75° F. (24° C.) or below. The polymer may be soluble or insoluble at higher temperatures. Water solubility, as defined herein, is tested as follows. A 1 g sample of the polymer is provided. The sample is added to a flask containing 100 mL of distilled water held at a temperature of 75° F. The flask is subjected to vigorous stirring or shaking for one minute(s), and then held still for 60 minute(s). If any precipitation of the polymer has occurred, the supernatant is poured from the flask and the precipitate is collected and weighed. The polymer is considered to be water soluble if not more than 5 wt % of the polymer precipitates.

In some embodiments the cold water insoluble polymer is a polysaccharide. Some examples of suitable polysaccharides include starches, starch derivatives, modified starches, thermoplastic starches, starch esters, such as starch acetate, starch hydroxyethyl ethers, alkyl starches, dextrins, amine starches, phosphate starches, and dialdehyde starches. The starch can be cationic, anionic, amphoteric, or non-ionic. Preferably, the starch is non-ionic. The starch derivatives include carboxymethyl-starch, hydroxyethylstarch, hydroxypropylstarch, carboxymethylhydroxypropylstarch, oxidized starch, and pregelatinized starch.

Some other examples of cold water insoluble polymers include synthetic polymers such as polyethylene, high density polyethylene, low density polyethylene, linear low density polyethylene, ultralow density polyethylene, polyolefins, poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), such as poly(methyl methacrylate), poly(ethyl methacrylate), and the like, poly(vinyl acetate), poly(ethylene-co-vinyl acetate), poly(vinyl alcohol), poly(ethylene-co-vinyl alcohol), polypropylene, polybutylene, polyesters, poly(ethylene terephthalate), poly(1,3-propyl terephthalate), poly(1,4-butylene terephthalate), poly(vinyl chloride), PVDC, poly(vinylidene chloride), polystyrene, polyamides, nylon, nylon 6, nylon 46, nylon 66, nylon 612, polycarbonates, polysulfides, polyethers, polysulfones, and the like, and copolymers thereof.

The prolamine barrier composition may contain at least about 40 wt % water, and in some embodiments between about 50 wt % and about 99 wt %.

The prolamine barrier composition may also include one or more water-soluble co-solvents. In some embodiments the co-solvent is soluble in both aqueous and nonaqueous solvents. The co-solvent may be multifunctional, i.e. it may serve as co-solvent for the prolamine and as a plasticizer for the film formed from the aqueous composition. Any suitable type of co-solvent can be used in the composition. In one embodiment, the co-solvent is a glycol, such as propylene glycol, ethylene glycol, diethylene glycol, triethylene glycol, or diethylene glycol monobutyl ether. Other examples of co-solvents that may be suitable include acetone, acetic acid, diethanol-amine, ethanol, formic acid, glycerol, lactic acid, methanol, isopropanol, propanol, and triethyl citrate.

The prolamine barrier composition may further include one or more stabilizers that, in combination with the other components of the composition, produce a stable aqueous composition as described more fully below. Any type of material suitable for stabilizing the composition can be used. When the cold water insoluble polymer is a starch, preferably the stabilizer bears an anionic charge. In such a case, a preferred stabilizer is a cellulose derivative, such as carboxymethylcellulose, hydroxyethylcellulose, methylcellulose, ethylcellulose, hydroxyethylpropylcellulose, methylhydroxypropylcellulose, or carboxymethylhydroxyethylcellulose.

Other examples of suitable stabilizers may include gums such as xanthan gum, guar gum and its derivatives, gum arabic, acacia gum, carrageenan gum, furcellaran gum, ghatti gum, locust bean gum, gum karaya, and gum tragacanth.

Other stabilizers may include polymeric or surfactant species such as polyacrylates, polyoxyethylene sorbitan monooleate (e.g., Tween 20 or Tween 80), other glycerides preferably those derivatives of fatty acids in the $C_8$-$C_{20}$ range, sodium lauryl sulfate and cetyltrimethylammonium bromide. Other stabilizers may include inorganic steric stabilizers such as magnesium carbonate, magnesium sulfate and magnesium silicate. Additionally the stabilizers may include functional agents such as water repellant agents including alkenyl succinic anhydride (ASA), alkyl ketene dimmer (AKD), styrene maleic anhydride, octynl succinic anhydride, rosin, rosin derivatives, styrene acrylic acetates, styrene acrylic emulsions, polyurethane dispersions, wax dispersions, and the like.

The stabilizer may be included in any amount suitable for providing a stable composition. For example, the stabilizer may be included in an amount within a range of from about 0.01 wt % to about 10 wt % of the composition.

The prolamine barrier composition, when applied to the substrate, may produce a composite article having a high surface energy. As used herein, "high surface energy" refers to an article having a surface energy of at least about 32 dynes/cm, and commonly at least about 36 dynes/cm. Surface energy can be measured by any suitable method, for example by contact angle measurement and the relationship between surface energies using Young's Equation.

The additive(s) applied to the fibrous substrate may further include a darkening or opacifying agent to make the composite article more opaque. In one embodiment, less than about 10% of ordinary sunlight is transmitted through the composite article, and more particularly less than about 5%. Any suitable darkening or opacifying agent, or a combination of different agents can be used, such as carbon black, charcoal and/or dark organic dye.

In some embodiments, the additive(s) include one or more of the following: probiotic agents, antioxidants, prooxidants, photoinhibitors, photoinitiators, wet strength agents, water repellants, or a combination of any of these additives.

Any suitable probiotic agent or a combination of different probiotic agents can be used. For example, the probiotic agents can be either microbes such as bacteria or fungi, or nutrients to promote the growth of microbes. Such nutrients are well known to those skilled in microbiology.

Any suitable antioxidant or a combination of different antioxidants can be used. Some nonlimiting examples of antioxidants include BHA, BHT, triethyl phosphite, t-butyl-hydroxyquinone, and certain phenolic compounds. Also, any suitable prooxidant or a combination of different prooxidants can be used. Some nonlimiting examples of prooxidants include certain metal acetyl acetonates, metal alkyl benzoylacetates, metal acetylacetonates, metal stearates and metal oleates.

The additives can include any suitable photoinhibitor or a combination of different photoinhibitors. Some nonlimiting examples include hydroquinone, 3-t-butyl-4-hydroxy-5-methylphenyl sulfide and t-butylpyrocatechol. Also, the additives can include any suitable photoinitiators or a combination of different photoinitiators. Some nonlimiting examples include aromatic onium salt or iron arene salt complexes available from Ciba Specialty Chemicals Corp., Terrytown, N.Y.

Any suitable wet strength agent or a combination of different agents can be included as an additive. Some nonlimiting examples include melamine formaldehyde resin, polymeric amine-epichlorohydrin resin, phenolic resin, and glyoxalated polyacrylamide resin.

Also, any suitable water repellant or a combination of repellants can be included as an additive. Some nonlimiting examples include compounds such as paraffin wax, fluorinated compounds such as Scotchban™, silicones, and the like.

If multiple additives are applied to the fibrous substrate, they can be applied together as a mixture or they can be applied separately. In one embodiment, the additives are mixed together with heating to make a fluid mixture which is then applied to the fibrous substrate. The fluid mixture can include water or any other suitable fluid ingredient to produce a fluid mixture that is suitable for application to the substrate.

The following table shows some nonlimiting examples of possible additive compositions. The components are mixed together with heating to produce a fluid mixture, and then the fluid mixture is applied as a coating on a fibrous substrate such as a paper sheet to produce a composite article.

| Composition | Example 1 | Example 2 |
| --- | --- | --- |
| zein | 2.0% | — |
| ethylated starch | 1.8% | — |
| water | 52% | 40% |
| propylene glycol | 4% | — |
| xanthan gum | 0.3% | — |
| citric acid | 3.0% | 3.2% |
| zeolite | 3.3% | 5.0% |
| vegetable drying oil | 33% | 50% |
| carbon black | 0.6% | 1.8% |

The composite article can have any form suitable for use in its intended application. For example, a composite article for use as a mulch in the agricultural, horticultural and/or forestry industries is generally in the form of a thin sheet. The sheet can have any suitable thickness, for example a thickness within a range of from about 0.0015 inch to about 0.01 inch. If the composite article is a substrate coated with a layer of a additive, the substrate and the additive layer can have any suitable thicknesses, for example a substrate thickness within a range of from about 0.0015 inch to about 0.006 inch and an additive layer thickness within a range of from about 0.0004 inch to about 0.004 inch. The width of the sheet may vary depending on the particular application. For example, a composite article for use as an agricultural mulch may be a relatively wide (e.g., between about 1 ft. and about 12 ft.) and continuous sheet that is held on a roll for application in a field by mulch laying equipment.

The composite article is relatively lightweight, having a weight of less than about 57 grams per square meter. In a particular embodiment, the composite article is relatively strong, having a breaking length of at least about 1 km, and a wet tensile strength of at least about 0.1 km in both the machine and cross directions. Breaking length is a measure of the length of a sheet that is self supporting if held vertically. It can be measured by any suitable method, for example by Tappi Test Method T494. Wet tensile strength is the resistance of a material to a force tending to tear it apart, measured as the maximum tension the material can withstand without tearing. It can be measured by any suitable method, for example by Tappi Test Method T-456.

The additive(s) applied to the fibrous substrate may limit the porosity or air permeability of the composite article. In one embodiment, the composite article has a Sheffield Porosity of no more than about 100 cubic centimeters per minute of air through a 0.75" orifice for a single sheet. This is measured by use of any suitable method, for by Tappi Test Method T-547.

The combination of the fibrous substrate and the additive(s) applied to the substrate produce a composite article having a controlled rate of environmental biodegradation. In one embodiment, the biodegradation rate of the composite article is within a range of from about 30 days to about 150 days. The biodegradation rate can be measured by any suitable method. For example, the biodegradation rate can be measured by placing the paper mulch on moist soil and observing the integrity of the mulch over time. This evaluation is preferably conducted in a controlled environment where the temperature is maintained between 60° F. and 90° F. and the soil is maintained in a moist state (damp to the touch but not saturated). When the mulch cover loses its integrity, the elapsed time is recorded and the biodegradation rate is reported in days. The mulch may be considered to lose its integrity when it loses 90% of its wet tensile strength. The tensile strength can be measured as described above or by any other suitable method. Another method of measuring biodegradation rate of an agricultural mulch is disclosed in U.S. Pat. No. 6,401,390 at col. 7, lines 38-59, which is incorporated by reference herein.

In accordance with the provisions of the patent statutes, the principle and mode of operation of the composite article have been explained and illustrated in its preferred embodiment. However, it must be understood that the composite article may be practiced otherwise than as specifically explained and illustrated without departing from its spirit or scope.

What is claimed is:

1. A mulch comprising:
    a rolled mulch sheet capable of installation on the ground with a mechanical unrolling device, the mulch sheet constructed as at least one of an agricultural mulch, a horticultural mulch and a forestry mulch;
    the mulch sheet including a fibrous substrate in the form of a continuous sheet having a width within a range of from about 1 foot to about 12 feet; and
    the mulch sheet further including a combination of water repellent, biodegradable binder and antimicrobial agent applied to the fibrous substrate to control the rate of biodegradation of the mulch sheet;
    the mulch sheet having a thickness within a range of from about 0.0015 inch to about 0.01 inch, a weight of less than about 57 grams per square meter, and a biodegradation rate of between about 30 days and about 150 days.

2. The mulch of claim 1 additionally comprising a darkening agent applied to the fibrous substrate which opacifies the mulch sheet so that less than about 10% of ordinary sunlight is transmitted through the mulch sheet.

3. The mulch of claim 2 wherein the water repellent comprises drying oil.

4. The mulch of claim 3 wherein the antimicrobial agent comprises zeolite.

5. The mulch of claim 4 wherein the biodegradable binder comprises prolamine.

6. A mulch comprising:
    a rolled mulch sheet capable of installation on the ground with a mechanical unrolling device, the mulch sheet constructed as at least one of an agricultural mulch, a horticultural mulch and a forestry mulch;
    the mulch sheet including a fibrous substrate in the form of a continuous sheet having a width within a range of from about 1 foot to about 12 feet; and
    the mulch sheet further including a combination of prolamine and zeolite applied to the fibrous substrate to control the rate of biodegradation of the mulch sheet;
    the mulch sheet having a thickness within a range of from about 0.0015 inch to about 0.01 inch, a weight of less than about 57 grams per square meter, and a biodegradation rate of between about 30 days and about 150 days.

7. The mulch of claim 6 additionally comprising a darkening agent applied to the fibrous substrate which opacifies the mulch sheet so that less than about 10% of ordinary sunlight is transmitted through the mulch sheet.

8. A mulch comprising:
    a mulch sheet constructed as at least one of an agricultural mulch, a horticultural mulch and a forestry mulch, the mulch sheet having at least one of a hole and a slit configured to facilitate installation of the mulch sheet around a plant stem or a tree;
    the mulch sheet including a fibrous substrate in the form of a continuous sheet having a width within a range of from about 1 foot to about 12 feet; and
    the mulch sheet further including a combination of water repellent, biodegradable binder and antimicrobial agent applied to the fibrous substrate to control the rate of biodegradation of the mulch sheet;
    the mulch sheet having a thickness within a range of from about 0.0015 inch to about 0.01 inch, a weight of less than about 57 grams per square meter, and a biodegradation rate of between about 30 days and about 150 days.

9. The mulch of claim 8 wherein the mulch sheet has both the hole and the slit.

10. The mulch of claim 8 additionally comprising a darkening agent applied to the fibrous substrate which opacifies the mulch sheet so that less than about 10% of ordinary sunlight is transmitted through the mulch sheet.

11. The mulch of claim 10 wherein the water repellent comprises drying oil.

12. The mulch of claim 11 wherein the antimicrobial agent comprises zeolite.

13. The mulch of claim 12 wherein the biodegradable binder comprises prolamine.

14. A mulch comprising:
    a mulch sheet constructed as at least one of an agricultural mulch, a horticultural mulch and a forestry mulch, the mulch sheet having at least one of a hole and a slit configured to facilitate installation of the mulch sheet around a plant stem or a tree;
    the mulch sheet including a fibrous substrate in the form of a continuous sheet having a width within a range of from about 1 foot to about 12 feet; and
    the mulch sheet further including a combination of prolamine and zeolite applied to the fibrous substrate to control the rate of biodegradation of the mulch sheet;
    the mulch sheet having a thickness within a range of from about 0.0015 inch to about 0.01 inch, a weight of less than about 57 grams per square meter, and a biodegradation rate of between about 30 days and about 150 days.

15. The mulch of claim 14 wherein the mulch sheet has both the hole and the slit.

16. The mulch of claim 14 additionally comprising a darkening agent applied to the fibrous substrate which opacifies the mulch sheet so that less than about 10% of ordinary sunlight is transmitted through the mulch sheet.

* * * * *